United States Patent Office 2,976,291
Patented Mar. 21, 1961

2,976,291

ETHERS OF 2-PIPERIDYLPHENYLMETHANOLS

Robert Michel Jacob, Ablon-sur-Seine, and Nicole Marie Joseph, Paris, France, assignors to Societe des Usines Chimiques Rhone-Poulenc, Paris, France, a corporation of France No Drawing. Filed July 17, 1958, Ser. No. 749,075

Claims priority, application France Aug. 1, 1957

10 Claims. (Cl. 260—294.7)

This invention relates to new ethers of 2-piperidylphenylmethanols and to processes for their preparation. 2-piperidylphenylmethanols of the general formula:

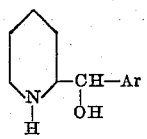

I wherein Ar represents an unsubstituted phenyl group or a phenyl group containing one or more substitutes such as for example halogen atoms or alkyl, alkoxy, aralkoxy, methylenedioxy, cyano, thiocyano, acyl, acyloxy, alkoxycarbonyl, alkylthio, alkylsulphonyl, sulphonamido, nitro, amino or acylamino groups possess two asymmetrical carbon atoms and consequently they can each exist as a racemate in two stereoisomeric forms A and B (cf. K. E. Crook and S. H. McElvain, J. Amer. Chem. Soc. 52, 4006 (1930)). Form A is generally obtained as the main product on catalytic reduction of 2-benzoylpyridine optionally substituted in the benzene nucleus. When one or other of the two forms or a mixture thereof is treated with thionyl chloride in the cold and the chloro derivative thus obtained is hydrolysed, for example by means of an aqueous solution of a mineral acid or of silver nitrate, a single form only is obtained which is, by convention, designated form B. These two forms A and B of the 2-piperidylphenylmethanols are also distinguished by systematic differences in their infra-red spectra. It has been established that form A has the erythro and form B the threo structure respectively.

This invention is concerned only with ethers of form B (threo) type 2-piperidylphenylmethanols.

According to the present invention there are provided form B (threo) type ethers of unsubstituted or substituted 2-piperidylphenylmethanols of the general formula:

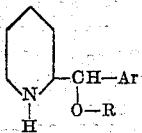

II where R represents a lower alkyl or alkenyl group and Ar is as hereinbefore defined.

These ethers of 2-piperidylphenylmethanol (form B) conforming to general Formula II possess very interesting central nervous stimulant properties which are observable in particular in the animal (rat) by a motor hyperactivity and an augmentation of its psychic aptitude in carrying out certain tests. The corresponding alcohols of form B as well as those of form A and the ethers of form A are practically inactive in this field in therapeutically useful doses.

According to further features of the present invention, the aforesaid new ethers of Formula II (form B) may be prepared by the following methods employing racemic mixtures or optically active isomers of the starting materials specified.

(1) Etherification of an unsubstituted or substituted 2-piperidylphenylmethanol of Formula I (form B) or an acid addition salt thereof by known methods for the etherification of aminoalcohols. During the etherification the nitrogen atom may be protected by a substituent which can readily be eliminated at the end of the reaction, such as a benzyl or acyl group. Preferably etherification is effected by the action of a reactive alkyl or alkenyl ester of formula RX (where R is as hereinbefore defined and X is an acid residue such as a halogen atom or a sulphuric or sulphonic ester residue) on an unsubstituted or substituted 2-piperidylphenylmethanol of general Formula I (form B), in which the nitrogen atom of the piperidyl group is protected by a benzyl or acyl group. A basic condensation agent such as sodamide may be present with advantage.

The expression "known methods" as used in this specification and accompanying claims means methods heretofore used or described in the chemical literature. The expression "substituted" has reference solely to substitution in a phenyl group. The term "lower" as applied to alkyl and alkenyl groups means that the group in question has not more than four carbon atoms.

(2) Condensation of a chloro derivative of the general formula:

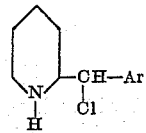

III with an alcohol R—OH or an alkali metal derivative of this alcohol (wherein Ar and R are as hereinbefore defined), the group NH being, if desired, temporarily protected e.g. by substitution with a substituent which can be readily eliminated such as a benzyl or acyl group.

(3) Reduction of the pyridyl group of an unsubstituted or substituted pyridyl ether of the general formula:

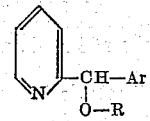

IV (wherein Ar and R are as hereinbefore defined) by known methods for the reduction of a pyridyl group to piperidyl. Preferably the reduction is effected by hydrogenation in the presence of a catalyst, for example, by means of hydrogen with the pyridyl ester in acetic acid in the presence of Adams' platinum.

The racemic ethers obtained by the aforesaid different methods may optionally be sepaarted into the individual optically active isomers by direct resolution. The optically active ethers possess qualitatively analogous properties to those of the racemates: they differ quantitatively, however, by the intensity of their activity which, combined with notable differences in their secondary effects, renders their use for therapeutic purposes probably more advantageous.

It is emphasised that with the ethers of the present invention the period of excitation resulting from administration to animals is not followed by a period of depression as is the case with certain other stimulants such as, for example, amphetamine. The ethers of substituted 2-piperidylphenylmethanols (form B) conforming to general Formula II are, therefore, useful in the treatment of states of fatigue and depression. Compounds of importance in this respect are those in which R is methyl, ethyl, propyl or isopropyl, and Ar is phenyl, p-methoxyphenyl, or 3:4-methylenedioxyphenyl; of particular importance is 1-phenyl-1-ethoxy-1-(2-piperidyl)methane (form B).

For therapeutic purposes, the bases of general Formula II are preferably employed in the form of acid addition salts containing pharmaceutically acceptable anions (such as hydrochlorides and other hydrohalides, phosphates, nitrates, sulphates, maleates, fumarates, citrates, tartrates, methanesulphonates and ethanedisulphonates).

The following examples illustrate the invention.

*Example I*

A mixture of 1-phenyl-1-(1-benzyl-2-piperidyl)methanol (form B) (19.5 g.) and sodamide (2.9 g.) in anhydrous toluene (450 cc.) is heated under reflux with agitation for 2 hours. After the mixture has been left to cool, methyl iodide (20 g.) is added and heating is continued for 2 hours. After cooling, the bases are extracted with 0.5 N hydrochloric acid (5×50 cc.). The aqueous solutions are washed with ether and then made alkaline with sodium hydroxide. The yellowish oil formed is extracted with ether and the ethereal extracts are washed with water, dried and evaporated leaving an orange oil (12.5 g.) which is dissolved in acetic acid (200 cc.). The product is debenzylated by hydrogenation in the presence of 5% palladised charcoal (1.3 g.) at 80° C. under a pressure of 20 kg./cm.$^2$ The catalyst is filtered off, the acetic acid is evaporated in vacuo and the residue is treated with water and made alkaline. The liberated debenzylated bases are extracted with chloroform. The chloroform solutions are washed with water, dried and evaporated in vacuo leaving an oil which is triturated with petroleum ether (20 cc.) A precipitate is formed which is washed and dried giving 1-phenyl-1-(2-piperidyl)methanol (form B) (2.32 g.), that is to say an unetherified product.

The filtrate is treated with ethereal hydrogen chloride (150 g. per litre; 30 cc.). The precipitated solid is recrystallised from a mixture of ethyl acetate (215 cc.) and ethanol (10 cc.). There is thus obtained 1-phenyl-1-methoxy-1-(2-piperidyl)methane hydrochloride (form B) (2.8 g.), M.P. 219° C. By concentration of the mother liquors a further 1.7 g. of the product is obtained, M.P. 217° C.

The 1-phenyl-1-(1-benzyl-2-piperidyl)methanol used as starting material may be obtained by the benzylation of 1-phenyl-1-(2-piperidyl)methanol (form B) by means of benzyl chloride. It melts at 91° C. after recrystallisation from hexane.

*Example II*

Proceeding as in Example I but replacing the methyl iodide by ethyl iodide, there is obtained 1-phenyl-1-ethoxy-1-(2-piperidyl)methane hydrochloride (form B), M.P. 234° C.

*Example III*

A mixture of 1-phenyl-1-(1-benzyl-2-piperidyl)methanol (form B) (193 g.), M.P. 91° C., and sodamide (29.5 g.) in anhydrous benzene (3.75 litres) is heated under reflux for 4 hours. A solution of ethyl toluene-p-sulphonate (180 g.) in anhydrous benzene (150 cc.) is added gradually over 30 minutes and boiling is continued for 3 hours. The cooled reaction mixture is washed with water and extracted with dilute hydrochloric acid (0.5 N, 5×100 cc.) at 50° C. The hydrated hydrochloride of 1-phenyl-1-ethoxy-1-(1-benzyl-2-piperidyl)methane (form B) (179 g.) precipitates from the dilute acid solutions from the extraction. After filtration and drying, it melts at about 110° C. The base is liberated with sodium hydroxide and extracted with ether. A colourless oil (140 g.) is obtained which is dissolved in glacial acetic acid (1.1 litres). Debenzylation is effected by hydrogenation in an autoclave at 70° C. under a pressure of 20 kg./cm.$^2$ in the presence of 3.2% palladised charcoal (15 g.) for 3 hours. The catalyst is filtered off and washed with acetic acid (2×50 cc.) and the solvent is evaporated in vacuo below 50° C. The residue from the evaporation is treated with distilled water (500 cc.), made alkaline with sodium hydroxide solution (d=1.33, 250 cc.) and extracted with ether (3×0.5 litre). After washing with water and drying, the ethereal solutions are evaporated leaving an oil which is treated with ether (120 cc.) containing about 15% hydrogen chloride. The precipitate obtained as recrystallised from ethyl acetate (1.7 litres) containing 20% ethanol. There is obtained the hydrochloride of 1-phenyl-1-ethoxy-1-(2-piperidyl)methane (form B) (74 g.), M.P. 234–235° C., identical with that described in Example II. On concentrating the liquors from the recrystallisation a second crop (16 g.) is obtained, M.P. 231° C.

*Example IV*

Proceeding as in Example III but replacing the ethyl toluene-p-sulphonate by di-n-propyl sulphate there is obtained in 84.5% yield the hydrated hydrochloride of 1-phenyl-1-n-propoxy-1-(1-benzyl-2-piperidyl)methane (form B).

The last mentioned hydrochloride (22.4 g.) is debenzylated directly at 20° C. in acetic acid (250 cc.) under a slightly elevated pressure of hydrogen (about 10 cm. of water) in the presence of palladium (3.2%) on charcoal (8 g.). After filtration and evaporation of the acetic acid and washing with ether, there is obtained the hydrochloride of 1-phenyl-1-n-propoxy-1-(2-piperidyl)methane (form B) (15.8 g.), M.P. 205° C., which on recrystallisation from butanone gives a product (13.2 g.), M.P. 210° C.

*Example V*

Proceeding as in Example IV but replacing the di-n-propyl sulphate by di-n-butyl sulphate there is obtained in 74% yield the hydrated hydrochloride of 1-phenyl-1-n-butoxy-1-(1-benzyl-2-piperidyl)methane. The corresponding base (16.5 g.) is liberated with sodium hydroxide and extracted with ether and, after drying and evaporation, the residue from the evaporation is debenzylated at 20° C. in acetic acid in the presence of palladium (3.2%) on charcoal under a slightly elevated pressure of hydrogen. The acetic acid is evaporated and the residue is treated with water, made alkaline with sodium hydroxide and extracted with ether. After drying, the ether is evaporated and the residual yellow oil (11.5 g.) is treated with ethyl acetate (200 cc.). The addition of 15% ethereal hydrogen chloride (18 cc.) precipitates the hydrochloride of 1-phenyl-1-n-butoxy-1-(2-piperidyl)-methane (form B) (9.5 g.), M.P. 189° C.

*Example VI*

A mixture of 1-phenyl-1-(2-piperidyl)methanol (form B) (9.5 g.) and sodamide (2.4 g.) in anhydrous benzene (200 cc.) is heated under reflux for 1 hour. A solution of ethyl toluene-p-sulphonate (12.3 g.) in anhydrous benzene (30 cc.) is added dropwise and boiling is continued for 2 hours. The cooled reaction mixture is washed with water (100 cc.) and then extracted with 2 N hydrochloric acid (100 cc. in 3 lots). The acid extracts are washed with ether, made alkaline with sodium hydroxide solution (d=1.33, 30 cc.) and the liberated bases are extracted with chloroform. After washing, drying over potassium carbonate and evaporation, a semi-crystalline residue is obtained which is triturated with petroleum ether (100 cc.). The insoluble crystals are the initial 1-phenyl-1-(2-piperidyl)methanol (4.5 g.; M.P. 172° C.). The oil (4.5 g.) obtained by evaporation of the filtrate is dissolved in butanone (30 cc.) and treated with 15% ethereal hydrogen chloride (6 cc.). There is obtained the hydrochloride of 1-phenyl-1-ethoxy-1-(2-piperidyl)methane (form B) (2 g.), identical with that described in Examples II and III.

*Example VII*

A mixture of 1-phenyl-(1-formyl-2-piperidyl)methanol (form B) (11 g.), M.P. 133° C., and sodamide (2.15 g.) in anhydrous benzene (300 cc.) is boiled for 3 hours. After cooling there is added ethyl iodide (9.4 g.) dissolved in anhydrous benzene (40 cc.). The mixture is then boiled for a further 4 hours. After cooling, the reaction mixture is washed successively with distilled water, dilute acid (0.5 N HCl), sodium bicarbonate and, finally, again with water. On drying over sodium sulphate and evaporating there is obtained 1-phenyl-1-ethoxy-1-(1-formyl-2-piperidyl)methane (form B) (6.7 g.).

A solution of this 1-phenyl-1-ethoxy-1-(1-formyl-2-piperidyl)methane (1.35 g.) in approximately 6% ethanolic hydrogen chloride (50 cc.) is heated under reflux for 24 hours, and the ethanol is then evaporated. The residue from the evaporation is treated with water, washed with benzene and then made alkaline with aqueous sodium hydroxide (d=1.33). After extraction with ether, drying and evaporating, the residue obtained (1.2 g.) is triturated with petroleum ether. The insoluble fraction (0.14 g.) melts at about 150° C. The residue (0.8 g.) from evaporation of the filtered petroleum ether gives, on the addition of ethereal hydrogen chloride, the hydrochloride of 1-phenyl-1-ethoxy-1-(2-piperidyl)methane (form B) (0.9 g.), identical with that described in Examples II, III and VI.

*Example VIII*

A mixture of 1-phenyl-1-(1-formyl-2-piperidyl)methanol (form B) (29.6 g.), M.P. 133° C., and sodamide (5.9 g.) in anhydrous benzene (500 cc.) is boiled for 2 hours. Allyl bromide (19.5 g.) dissolved in benzene (50 cc.) is added and boiling is continued for 3 hours. A white precipitate is formed. After standing overnight at room temperature the reaction mixture is washed successively with water, dilute hydrochloric acid, a 2% solution of sodium bicarbonate and water. It is then dried over sodium sulphate and evaporated. 1-phenyl-1-allyloxy-1-(1-formyl-2-piperidyl)methane (29 g.) is obtained in the form of an orange oil which is deformylated by boiling for 24 hours in an approximately 7% solution (weight/volume) (700 cc.) of hydrogen chloride in anhydrous methanol. The methanol is evaporated, the residue is treated with water and washed with ether and the aqueous phase is made alkaline. The liberated bases are extracted with ether (4×100 cc.) which is then dried over potassium carbonate and evaporated. There is thus obtained 1-phenyl-1-allyloxy - 1 - (2 - piperidyl)methane (16.3 g.) in the form of an oil. In order to prepare the hydrochloride this oil is dissolved in ethyl acetate (200 cc.) and treated with 15% (weight/volume) anhydrous ethereal hydrogen chloride (20 cc.). The hydrochloride of 1 - phenyl - 1 - allyloxy - 1 - (2 - piperidyl)methane (form B) (17.3 g.) is precipitated, M.P. 180–181° C.; picrate, M.P. 174° C.

*Example IX*

A mixture of laevorotatory 1-phenyl-1-(1-benzoyl-2-piperidyl)methanol (form B) (14.5 g.) and sodamide (2.03 g.) in anhydrous toluene (500 cc.) is boiled for 1½ hours. A solution of ethyl iodide (10.4 g.) in anhydrous toluene (30 cc.) is added and heating is continued for 2 hours. After standing overnight the toluene solution is washed successively with water (200 cc.), 2 N hydrochloric acid (250 cc.) and water. It is then dried over potassium carbonate and evaporated in vacuo at a temperature not exceeding 50° C. The residue from the evaporation is an oil (12 g.). It is dissolved in benzene (20 cc.) and petroleum ether (180 cc.) is added. There is precipitated laevorotatory 1-phenyl-1-ethoxy-1-(1-benzoyl-2-piperidyl)-methane (form B) (8.7 g.), M.P. 120–122° C., having the specific rotatory power $[\alpha]_D^{20} = -99.4°$ (c=1, chloroform). An additional recrystallisation from cyclohexane (50 cc.) gives a product (7.53 g.), M.P. 122° C., of rotatory power $[\alpha]_D^{20} = -106°$ (c=1, chloroform).

A product (1.08 g.) having the same characteristics can be recovered from the mother-liquors. The laevorotatory 1 - phenyl - 1 - ethoxy - 1 - (1-benzoyl-2-piperidyl) methane (form B) (8.6 g.) thus obtained is debenzoylated by boiling for 4 hours in the presence of lithium aluminium hydride (0.67 g.) in tetrahydrofuran (260 cc.) freshly distilled over sodium. After cooling the mixture to 0° C. there are added successively with agitation distilled water (0.67 cc.), 4 N sodium hydroxide (0.67 cc.) and water (2.01 cc.). Agitation is continued for 20 minutes at 0° C. The inorganic precipitate is filtered off and treated with boiling tetrahydrofuran (50 cc.) for 15 minutes. After further filtration the combined tetrahydrofuran solutions are evaporated below 40° C. (under a pressure of 20 mm. Hg). The oily residue obtained (9 g.) is treated with ether and extracted with 2 N hydrochloric acid. The aqueous phase is made alkaline and the liberated bases are extracted with ether.

After washing with water, drying over potassium carbonate and evaporating, the residual oil (4.7 g.) is dissolved in ethyl acetate containing 10% ethanol (60 cc.) and converted into the hydrochloride by the addition of 15% anhydrous ethereal hydrogen chloride (4.8 cc.).

The hydrochloride of laevorotatory 1-phenyl-1-ethoxy-1-(2-piperidyl)-methane (form B) (2.55 g.), M.P. 260–265° C., is obtained having the specific rotatory power: $[\alpha]_D^{20} = -70°$ (c=1, chloroform).

The laevorotatory 1-phenyl-1-(1-benzoyl-2-piperidyl)methanol (form B) which serves as starting material is prepared by the action upon 1-phenyl-1-(2-piperidyl) methanol of the same configuration of an equal weight of pure benzoyl chloride in a mixture of N/2 potassium hydroxide and ether. It melts at 170° C. and has the specific rotatory power: $[\alpha]_D^{20} = -108°$ (c=1, chloroform).

*Example X*

The dextrorotatory hydrochloride of 1-phenyl-1-ethoxy-1-(2-piperidyl)methane (form B), M.P. 260–265° C., (Maquenne), $[\alpha]_D^{20} = +70°$ (c=1, chloroform), may be prepared in the same manner as its antipode by the debenzoylation of dextrorotatory 1-phenyl-1-ethoxy-1-(1-benzoyl-2-piperidyl)methane (form B), M.P. 122° C. and having the specific rotatory power $[\alpha]_D^{20} = +102°$ (c=1, chloroform); itself obtained from 1-phenyl-1-(1-benzoyl-2-piperidyl)methanol of the same configuration, M.P. 170° C., $[\alpha]_D^{20} = +108°$, (c=1, chloroform).

*Example XI*

A solution of the hydrochloride of 1-p-methoxyphenyl-1-(2-piperidyl)chloromethane (form B) (3 g.), M.P. 206–208° C., in ethanol (150 cc.) is boiled for 2 hours. The ethanol is evaporated, the residue is triturated with ether and there is obtained the hydrochloride of 1-p-methoxyphenyl-1-ethoxy - 1 - (2 - piperidyl)methane (form B) (3 g.) which melts at 237° C. after recrystallisation from methyl ethyl ketone or acetone.

In this and the following examples the chloro derivatives used as starting materials are obtained by the action of thionyl chloride upon the corresponding alcohols, obtained by reduction of the corresponding benzoyl pyridines.

*Example XII*

A solution of the hydrochloride of 1-(3:4-methylenedioxyphenyl) - 1 - (2 - piperidyl)chloromethane (form B), (8.8 g.), M.P. 160.5–161.5° C., in ethanol (50 cc.) is boiled for 2 hours. The formation of a white solid is observed and, on filtration, there is obtained the hydrochloride of 1-(3:4 - methylenedioxyphenyl)-1-ethoxy-1-(2-piperidyl)methane (form B) (7 g.) which melts at 260° C. after recrystallisation from isopropanol.

*Example XIII*

Proceeding in the same manner as in Example XII but in isopropanol and commencing with the hydrochloride of 1-(3:4-methylenedioxyphenyl) - 1 - (2 - piperidyl) chloromethane (form B) (2 g.), M.P. 160.5–161.5° C., there is obtained the hydrochloride of 1-(3:4-methylenedioxyphenyl) - 1 - isopropoxy - 1 - (2 - piperidyl)methane (form B) (1.8 g.) which melts at 303–305° C. after recrystallisation from ethanol.

*Example XIV*

A solution of the hydrochloride of 1-p-ethoxyphenyl-1-(2-piperidyl)-chloromethane (form B) (6.5 g.), M.P. 168–169° C., in ethanol (50 cc.) is boiled for 2 hours. After concentration and the addition of ether there is obtained the hydrochloride of 1-p-ethoxyphenyl-1-ethoxy-1-(2-piperidyl)methane (form B) (6 g.) which melts at 232° C. after recrystallisation from a mixture of isopropanol and isopropyl ether.

The present invention includes within its scope pharmaceutical compositions comprising one or more of the compounds of Formula II, or an acid addition salt thereof, and a significant amount of pharmaceutical carrier which may be either a solid material or a liquid.

Preparations for oral ingestion can be liquids or solids or any combination of these forms, such as solutions, suspensions, syrups, elixirs, emulsions, powders or tablets. Pharmaceutical preparations for administration of the acetive therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.02% by weight of active substance in the case of injectable solutions and at least 0.01% by weight of such substance in the case of oral preparations.

We claim:

1. A member of the class consisting of the racemates and optically active isomers of compounds of the formula:

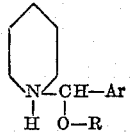

wherein R is selected from the class consisting of methyl, ethyl, n-propyl, n-butyl, isopropyl and allyl and Ar is selected from the class consisting of phenyl, p-methoxyphenyl, 3,4-methylene dioxyphenyl, and p-ethoxyphenyl and acid addition salts of the said compounds which have pharmaceutically acceptable anions.

2. A member of the class consisting of 1-phenyl-1-methoxy-1-(2-piperidyl)methane (form B) and its acid addition salts which have pharmaceutically acceptable anions.

3. A member of the class consisting of 1-phenyl-1-ethoxy-1-(2-piperidyl)methane (form B) and its acid addition salts which have pharmaceutically acceptable anions, and optical isomers.

4. A member of the class consisting of 1-phenyl-1-n-propoxy-1-(2-piperidyl)methane (form B) and its acid additions salts which have pharmaceutically acceptable anions.

5. A member of the class consisting of 1-phenyl-1-n-butoxy-1-(2-piperidyl)methane (form B) and its acid addition salts which have pharmaceutically acceptable anions.

6. A member of the class consisting of 1-phenyl-1-allyloxy-1-(2-piperidyl)methane (form B) and its acid addition salts which have pharmaceutically acceptable anions.

7. A member of the class consisting of 1-p-methoxyphenyl-1-ethoxy-1-(2-piperidyl)methane (form B) and its acid addition salts which have pharmaceutically acceptable anions.

8. A member of the class consisting of 1-(3:4-methylenedioxyphenyl)-1-ethoxy-1-(2-piperidyl)methane (form B) and its acid addition salts which have pharmaceutically acceptable anions.

9. A member of the class consisting of 1-(3:4-methylenedioxyphenyl)-1-isopropoxy-1 - (2 - piperidyl)methane (form B) and its acid addition salts which have pharmaceutically acceptable anions.

10. A member of the class consisting of 1-p-ethoxyphenyl-1-ethoxy-1-(2-piperidyl)methane (form B) and its acid addition salts which have pharmaceutically acceptable anions.

References Cited in the file of this patent

Anker et al.: Chemical Society Journal (1945), pp. 917–920.

Heer et al.: Helv. Chim. Acta (Swiss), vol. 38 (1955), pp. 134–140.

Karrer: Organic Chemistry, 2nd ed. (1946), Elsevier Pub. Co., New York, pp. 92–102.